Sept. 5, 1944.                    J. R. HORTON                    2,357,654
                         TURBO POWER TRANSMISSION APPARATUS
                           Filed March 10, 1942        5 Sheets-Sheet 1

Joseph R. Horton
           INVENTOR.

BY

Sept. 5, 1944. J. R. HORTON 2,357,654
TURBO POWER TRANSMISSION APPARATUS
Filed March 10, 1942 5 Sheets-Sheet 4

Joseph R. Horton
INVENTOR.

BY
Victor J. Evans & Co.
ATTORNEYS

Sept. 5, 1944.  J. R. HORTON  2,357,654
TURBO POWER TRANSMISSION APPARATUS
Filed March 10, 1942  5 Sheets-Sheet 5

Joseph R. Horton
INVENTOR.

BY
Victor J. Evans & Co.
ATTORNEYS

Patented Sept. 5, 1944

2,357,654

UNITED STATES PATENT OFFICE 2,357,654

TURBO POWER TRANSMISSION APPARATUS

Joseph R. Horton, Knoxville, Tenn.

Application March 10, 1942, Serial No. 434,110

5 Claims. (Cl. 60—54)

This invention relates to a turbo power transmission apparatus of the type in which the motive fluid is impelled by a centrifugal pump device and is delivered onto the blades of a turbine wheel device adapted to propel a motor vehicle, ship or industrial equipment.

Objects on the invention are first, gear shifting is entirely eliminated, second, the motor always operates under ideal load conditions, third, the device is smooth in action and silent at all times, and fourth, the device replaces the conventional transmission and clutch at practically similar cost of manufacture and installation.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 6 is a side elevation of the driving shaft showing one set of the driving blades.

Figure 7 is a side elevation of the driven shaft showing one set of the driven blades.

Figure 1:
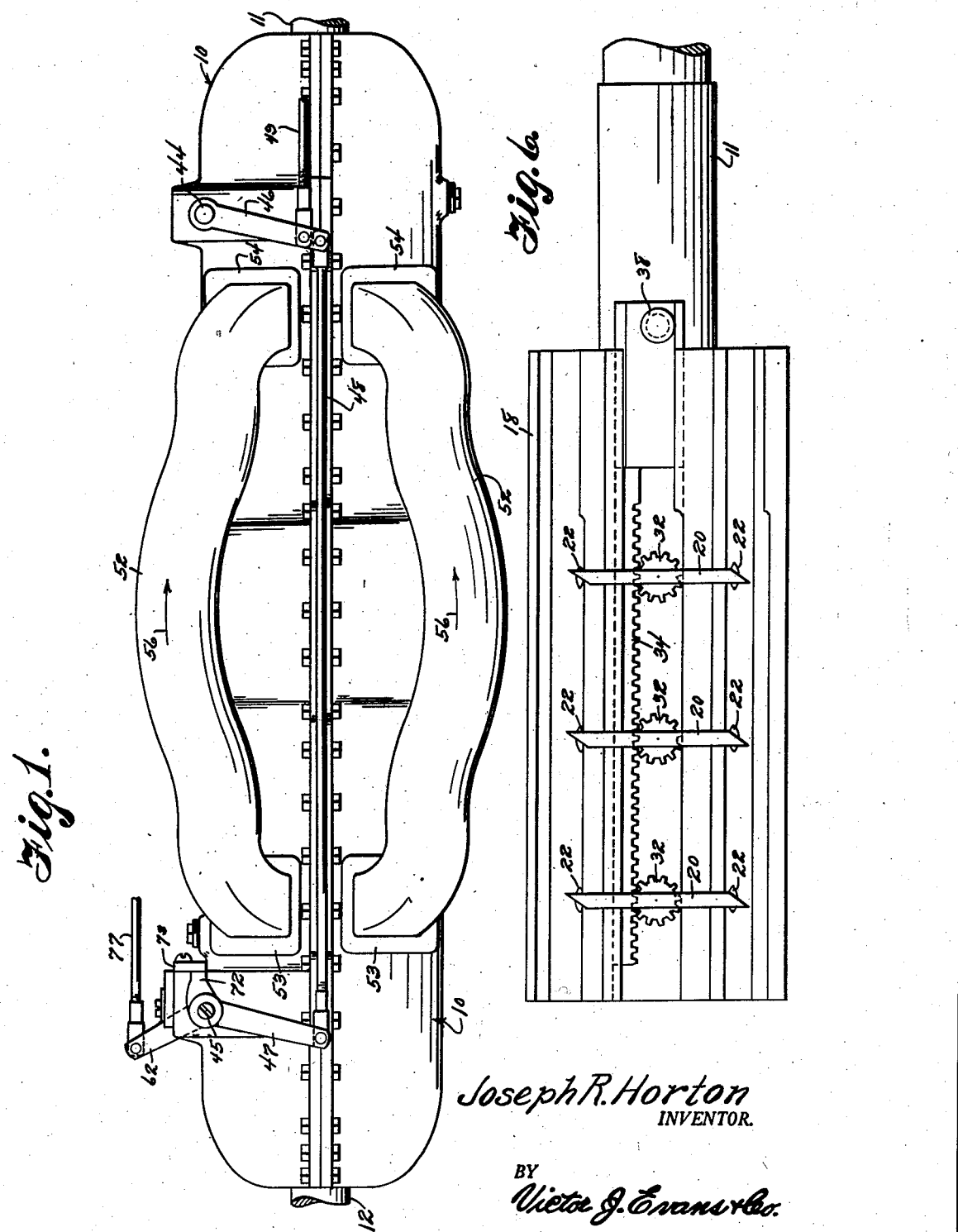
Figure 1 is a side elevation of the transmission.
Figure 2:
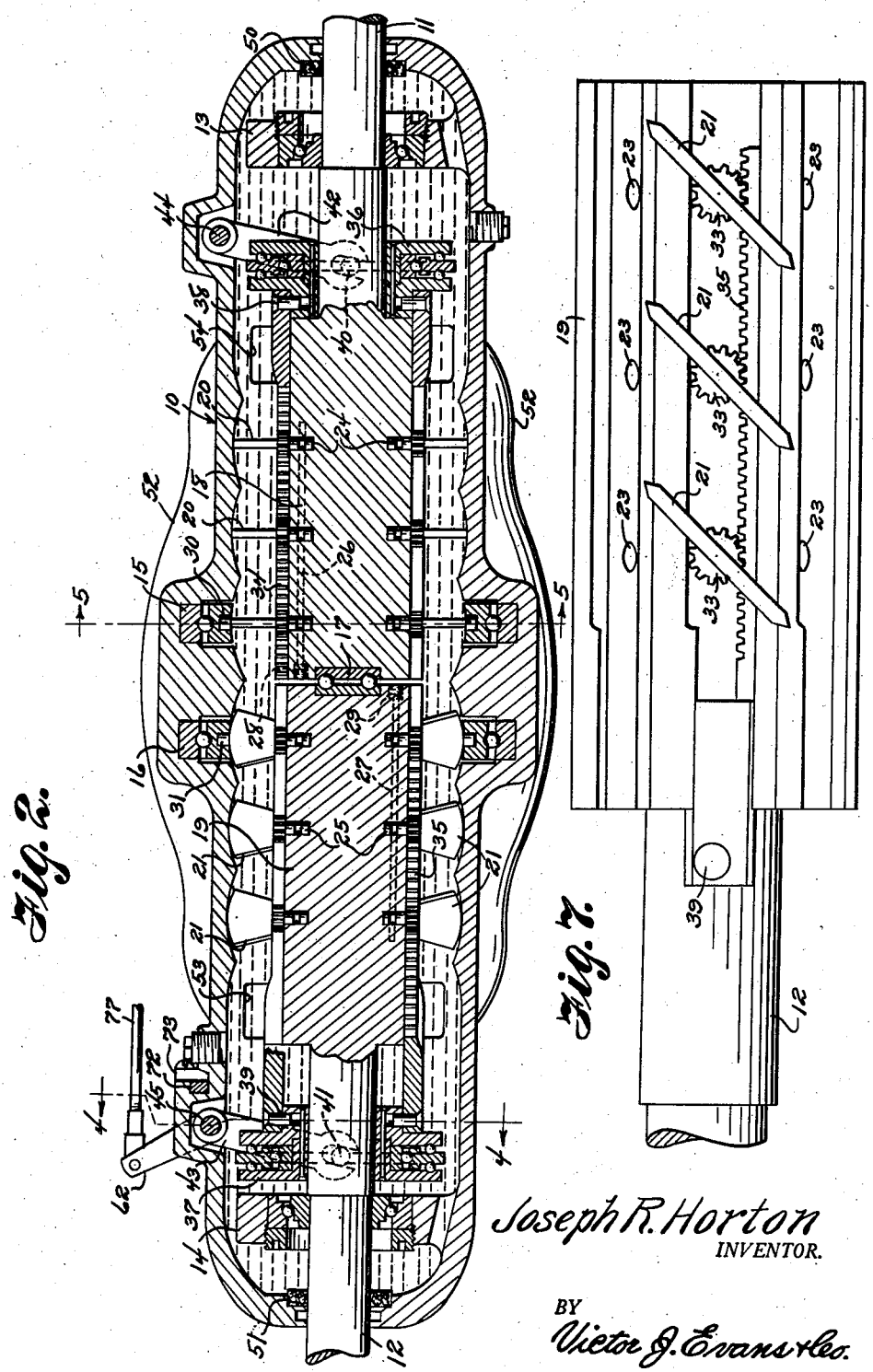
Figure 2 is a vertical sectional view of the transmission.
Figure 5:
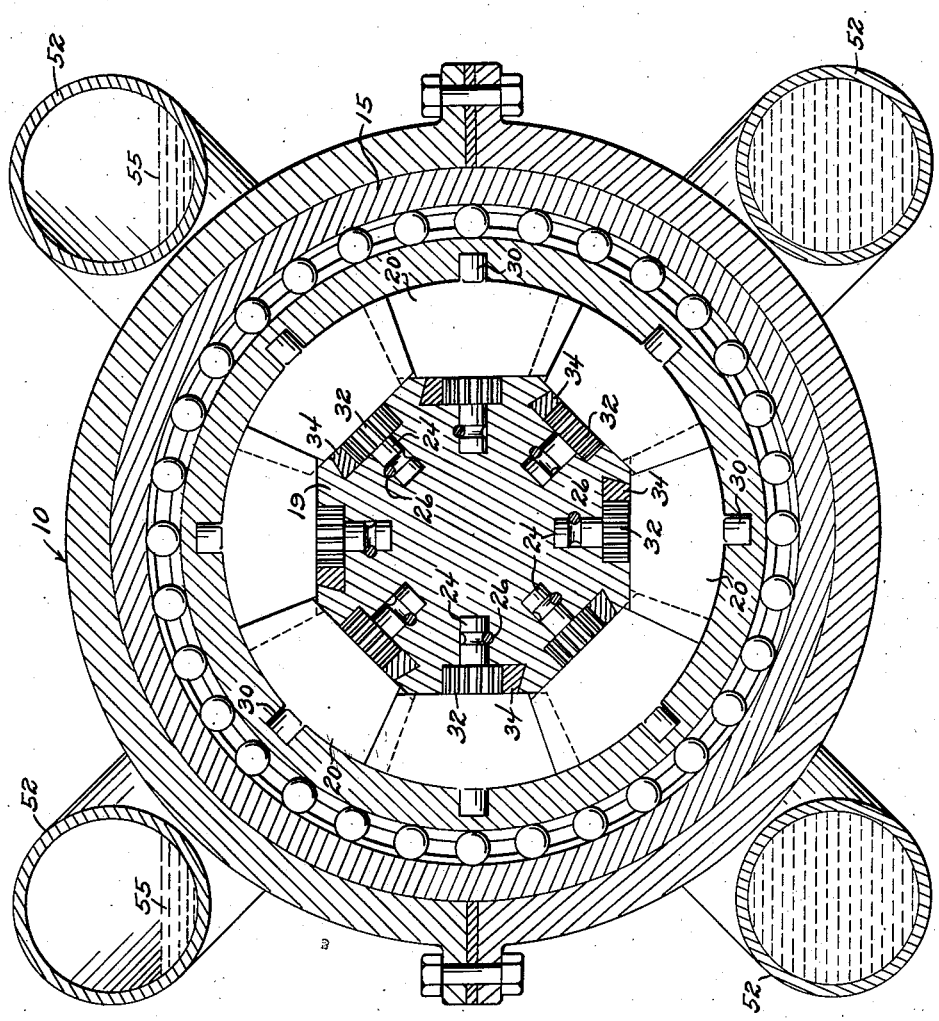
Figure 5 is a cross sectional view drawn to large scale taken on the line 5—5 of Figure 2 looking in the direction of the arrows.

Referring now to Figures 1 and 2 it will be seen that the transmission includes an elongated housing 10 formed of an upper section and a lower section bolted together. A driving shaft 11 enters the front end of the housing and a driven shaft 12 enters the rear end of the housing. The shafts turn on respective main bearings 13 and 14 built into and supported by the bottom section of the housing. The inner ends of the shafts are supported by respective ball bearings 15 and 16 which fit into recesses in the sections of the housing. Figure 5 shows a cross sectional view of the bearing 15 and a bearing 16 is similar to the bearing 15. Between the confronting inner ends of the driving shaft and the driven shaft a thrust bearing 17 is interposed to absorb the opposing thrusts of the main bearings 13 and 14.

The inner end portions 18 and 19 of both the driving shaft and the driven shaft respectively are uniformly enlarged and are of octagon shape in cross section, see Figure 5. Mounted radially in the enlarged portions are driving blades 20 and driven blades 21 respectively. Both the driving and the driven blades are mounted in three rows of eight blades each, a blade of each row being shown in Figures 6 and 7 while mounting openings for adjacent blades of each row are shown at 22 and 23 respectively. The base of each driving blade and driven blade is provided with a respective gudgeon 24 and 25 which rotatably fits in a respective opening 22—23 so that the blade is free to turn. Respective locking rods 26 and 27 are engaged through longitudinal openings in the driving and driven shafts and are engaged in circumferential grooves formed in the gudgeons 24 and 25 to hold the blades against dislodgement from their respective shafts. There are eight locking rods for each inner end portion of the shafts, each rod retaining three blades. The rods are held in place through the medium of respective screw heads 28 and 29 threadedly engaged in the openings which receive the rods.

The blades which are mounted in the rows next to the extreme inner end of each shaft are provided with projections 30 and 31 respectively which fit into recesses on the inner periphery of the bearings 15 and 16 so that the inner rows of blades serve to support the inner ends of the driving and driven shafts, yet are free to turn with the remaining blades.

On the base of each blade 20—21 is a respective spur gear 32 and 33 respectively, see Figures 6 and 7, which mesh with respective racks 34 and 35 which fit into respective longitudinal slots in the enlarged inner ends of the shafts and are of angular cross section, see Figure 5, so that the racks are free to slide endwise but cannot become dislodged from the slots because of the shape of the slot and of the rack. When the racks are slid endwise, as will presently be described, the respective blades are turned on their gudgeons 24—25.

Mounted on the shafts 11—12 at the outer ends of the racks are respective control collars 36—37 to which the ends of the respective racks are fixed by pins 38—39, or other connectors. Each collar is free to slide on its shaft, and turn as a unit with the shaft, due to the torque imparted to it by the racks. The collar 37 is shown in elevation in Figure 4 and is similar to the collar 36.

By referring to Figure 2 it will be seen that the center member of the collars 36—37 floats on ball bearings and the center members are provided with respective gudgeons 40—41. The gudgeons engage respective control arms 42—43, there being a control arm on each side of each collar, see Figure 4. The control arms are mounted on respective shafts 44—45. The shaft 44 projects at one end through the housing, see Figure 1, and is equipped with a crank arm 46 and the shaft 45 projects at both ends through the housing and is equipped at one end with a crank arm 47 also shown in Figure 1. The crank arms 46 and 47 are connected together by a rod 48 and a rod 49 connects the crank arm 46 to a control unit, mounted forward from the transmission, so that both shafts 44 and 45 may turn as a unit to adjust the relative angular positions of the driving and driven blades.

Oil retaining washers 50 and 51, see Figure 2, seal the housing at the localities where the driving and driven shafts enter the housing, so that the entire unit may be filled with a grade of oil which is suitable for hydraulic control purposes. Oil pipes 52, see Figure 1, extend longitudinally and exteriorly of the housing and at the rear end communicate with the housing through outlet ports 53 and at the front end communicate with the housing through inlet ports 54, see Figures 1 and 2. When the housing is filled to capacity with cold oil the approximate oil level will be as indicated at 55 in Figure 5.

The operation of the racks, spur gears, driving and driven blades is as follows. At idling speeds the control collars 36—37 are in the positions shown in Figure 2 while the driving and driven blades are also in the position shown in this figure. It will be pointed out that the driving blades 20, while in this position, form three disks, one of which is shown in Figure 5, which disks, although immersed in the oil and turning in it, do not impart any motion to it. While in idling position the driven blades are at approximately 40 degrees angle relatively to the driving blades but cannot turn the driven shaft 12 due to the oil being quiescent. The angle of the driven blades is such that when oil is flowing in the direction shown by the arrows 56 in Figure 1, the blades will turn the driven shaft 12 clockwise, this being the usual direction of the driving shaft in an automobile.

At speeds above idling the forward control collar will slide forward, due to the action of the control unit which is described later, and open the driving blades 20. These blades push the oil toward the driven blades 21. As the forward control collar 36 slides toward the front of the housing, or right end of the housing shown in Figure 2, the connecting rod 48 pulls the rear control collar 37 in the same direction, thus closing the driven blades. The edges of the driving blades are ground at an angle, see Figure 6, so that they are overlapping, while the edges of the driven blades are ground to a point, see Figure 7, so they may pass each other. This difference is necessary to provide for the reverse mechanism, which is described later.

It will be seen, from the above that any increase in speed of the motor will cause the driving blades to open and the driven blades to close, thus providing an infinite number of speed ratios. As the oil passes the last row of driven blades it emerges through the outlet ports 53, see Figure 2, and passes through the oil pipe 52, and from thence to the inlet ports 54 back into the housing where it is again engaged by the driving blades. This action is repeated constantly while the transmission is in use, and the speed ratio between the driven shaft 12 and the driving shaft 11 is governed entirely by the speed of the motor, through the action of the hereinafter described control unit.

Reverse control mechanism

Figure 3:
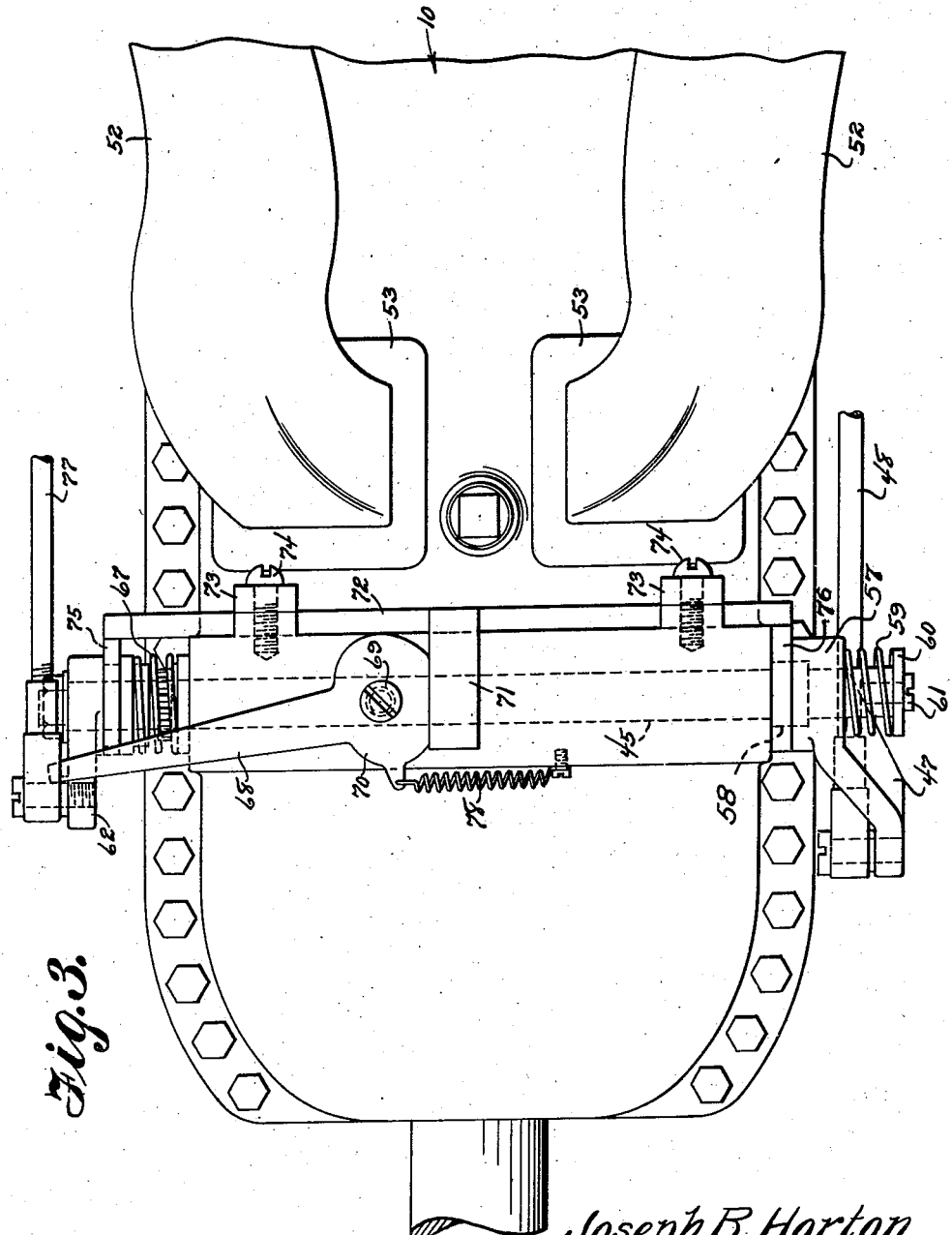
Figure 3 is a top plan view of the rear end of the transmission showing the reverse control.
Figure 4:
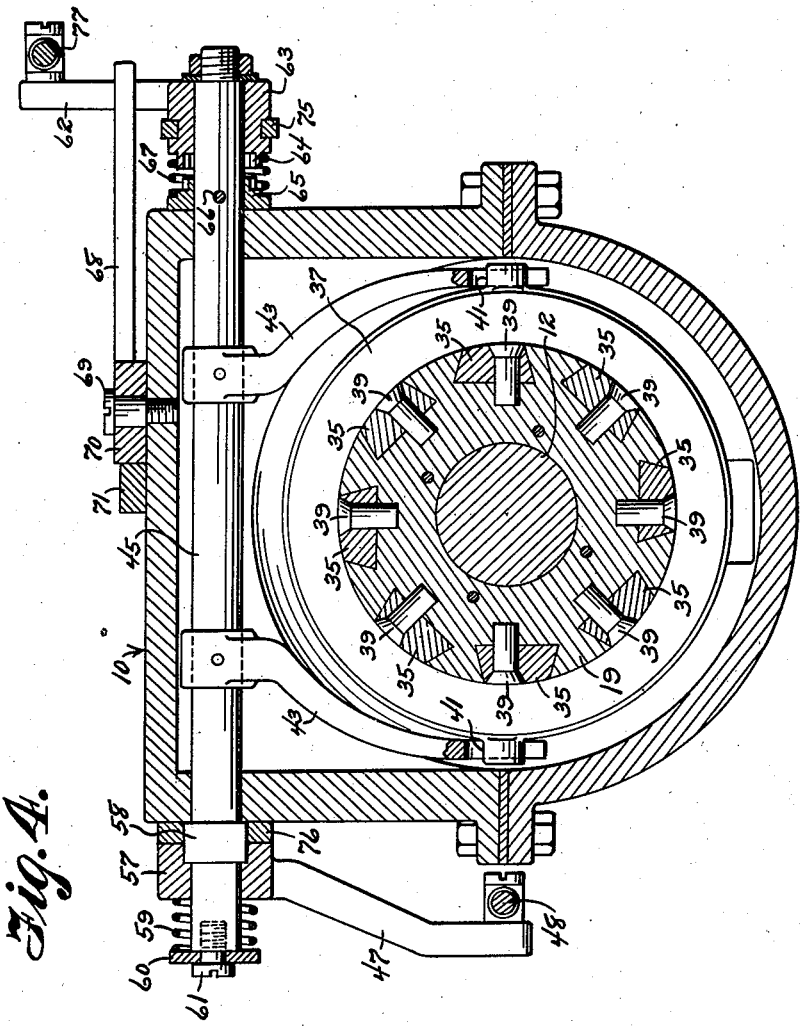
Figure 4 is a cross sectional view taken on the line 4—4 of Figure 2 looking in the direction of the arrows.

Located in the upper half of the housing and at the rear thereof is the reverse control mechanism shown in Figures 1, 3 and 4. The rear control arm 47, although connected to the forward control arm 46 by the rod 48, may be disconnected from the shaft 45 so that the shaft may be turned without affecting the rod 48 or forward control arm 46. For this purpose the rear control arm 47 is provided with an integral collar 57, see Figures 3 and 4, which is slidably fitted on the end of the shaft 45 and is provided with an angular recess which receives an angular enlargement 58 on the shaft, the collar being releasably held in engagement with the enlargement by a helical spring 59 which is sleeved on the shaft and is confined under tension between the collar 57 and a washer 60 secured to the shaft by a screw 61. The collar 57, when moved outwardly on the shaft against pressure of the spring disengages from the enlargement 58 so that the shaft 45 is disconnected from the control arm 47, to permit the shaft to be turned independently of the control arm.

The end of the shaft 45 opposite the control arm extends through the housing as shown in Figures 3 and 4 and is equipped with a reverse control arm 62. The reverse control arm is provided at its base with a collar 63 which is loose on the shaft 45 and is provided with a cylindrical spline 64 which coacts with a cylindrical spline 65 fixed to the shaft by a pin 66. A helical spring 67 is disposed between the spline 65 and the spline 64 to normally hold the reverse control arm 62 disconnected from the shaft.

A lever 68 is mounted on a pivot pin 69 which projects from the top of the housing. The lever is provided with a cam 70, see Figure 3, which engages a projection 71 on a U-shaped sliding arm 72. The arm 72 fits into a channel cut in the housing and is held in place by plates 73 secured to the housing by screws 74. The arm 72 is free to slide endwise and is provided at the opposite ends with forks 75 and 76. The fork 75 is received in a groove in the reverse control collar 63, see Figure 4. The fork 76 straddles the enlargement 58 of the shaft 45 behind the collar 57 of the control arm 47.

The cam lever 68 projects into the path of the reverse control arm 62. The reverse control arm is connected to a pedal on the floor of the automobile, this pedal taking the place of the usual clutch pedal since no clutch pedal is needed. The connection is made by a rod 77.

It can now be seen that depressing the reverse pedal will pull the reverse control arm 62 forwardly and in the first part of its forward travel the arm will engage the lever 68 and cause the cam 70 to push to one side the sliding arm 72, which in turn disengages the control arm 47 from the enlargement 58 on the shaft 45 and engages the reverse control arm 62 with the shaft 22 at the splines 64 and 65. Once the projection 71 on the sliding arm 72 is disposed on the high arcuate side of the cam 70 it will remain stationary, thus allowing the reverse control arm 62 to remain engaged with the shaft for the remaining part of its forward travel. The remaining part of the forward travel of the reverse control arm 62 will cause the angle of the driven blades to be reversed, thus causing the driven shaft 12 of the transmission to turn in a direction opposite to normal.

It will be remembered that the edges of the driven blades are ground to a point and can be brought past each other, see Figure 7. Experiment determines the angle at which the driven blades must be pitched when the reverse pedal is against the floor board.

This angle is predetermined and stationary, the speed ratio being obtained by the movement of the driving blades alone. This is in contrast to the forward movement of the vehicle where the pitches of both driving and driven blades determine the speed ratio.

A helical spring 78 is connected to the cam 70 and to the housing to return the cam to initial position after each actuation. At this time the helical spring 59 reverses the endwise movement of the sliding arm 72 and couples the control arm 47 with the shaft 45 and simultaneously disengages the splines to uncouple the reverse control arm 62 from the shaft.

From the above description it is thought that the construction and operation of the invention will be fully understood without further explanation.

What is claimed is:

1. In turbo power transmission apparatus, a driving shaft, a driven shaft in alignment with the driving shaft, a housing having bearings mounting both shafts and forming a fluid container, radially disposed blades axially revoluble on each shaft, respective rack and gear means on the shafts for turning the blades, coupling means setting the rack and gear means simultaneously to vary the relative pitch of the driving and driven blades, reversing means for disconnecting the coupling means from the driven blades and setting the rack and gear means of the driven blades to reverse the pitch of the driven blades, and means for circulating the fluid in the housing from the driven blades to the driving blades.

2. The structure as of claim 1 and in which the rack and gear means comprises, stems on the blades engaged in openings in the respective shaft, gears on said stems, racks slidable longitudinally in retaining grooves in the shaft engaging the gears, said stems having circumferential grooves, tie rods disposed in longitudinal openings in the shaft engaged in the stem grooves, and a collar longitudinally shiftable on the shaft connected to the racks for moving the racks to turn the gears.

3. The structure as of claim 1, and in which the coupling means comprises a pair of shafts journaled in the housing having arms connected to the shiftable collars of both sets of rack and gear means, crank arms on the shafts, a rod connected to both crank arms, and a rod connected to one of the crank arms and to an adjusting member.

4. The structure as of claim 1, and in which the reversing means comprises a shaft forming part of the coupling means, a spring clutch connecting the shaft to the gear and rack means of the driven blades, a crank arm on the shaft adapted to be connected to a manually controlled pedal, a cam rotatably mounted on the housing, a lever integral with the cam disposed in the path of the crank arm, a clutch for connecting the crank arm with the shaft, an arm slidable transversely of the housing having forks engaging the first and second named clutches, a projection on the arm engaged by the cam to shift the arm endwise and declutch the first named clutch from the shaft and clutch the second named clutch to the shaft when the crank arm moves the lever, and a spring connected to the cam for resetting the cam to initial position after each actuation, the controlling spring of the first named clutch subsequently resetting the sliding arm and the second named clutch to normal position.

5. In turbo power transmission apparatus, a driving shaft, a driven shaft in alignment with the driving shaft, a thrust bearing between the innermost ends of both shafts, main bearings in the housing mounting the outer ends of the shafts, bearings in the housing at the innermost ends of the shafts, rows of radially disposed blades axially revoluble on each shaft, projections on the rows of blades next to the extreme inner ends of the shafts engaged in recesses in the last named bearings causing the innermost rows of blades to support the inner ends of the shafts in the last named bearings, respective rack and gear means on the shafts for turning the blades to vary the pitch of the blades, coupling means setting the rack and gear means simultaneously, reversing means for disconnecting the coupling means from the driven blades and setting the rack and gear means of the driven blades independently of the driving blades, and means for circulating fluid in the housing from the driven blades to the driving blades.

JOSEPH R. HORTON.